July 1, 1958

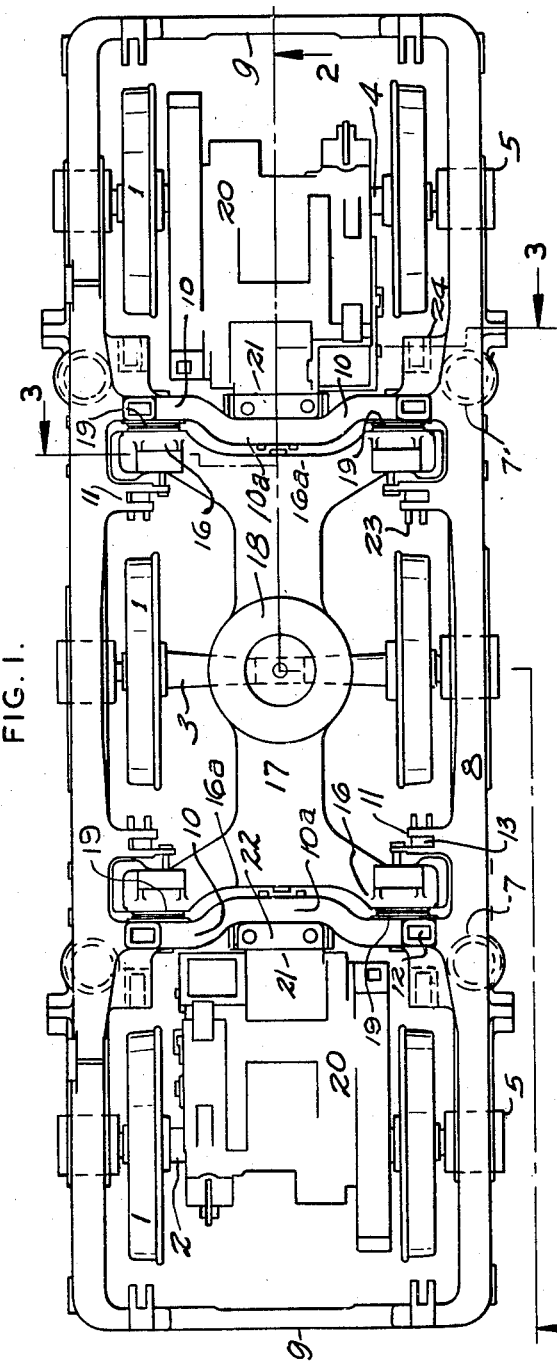

J. C. TRAVILLA ET AL 2,841,095

RAILWAY VEHICLE TRUCK

Filed Aug. 30, 1954

INVENTORS
James C. Travilla
Adelbert E. Wintenberg
Robert E. Stein
By Rodney Bedell
atty United States Patent Office
2,841,095
Patented July 1, 1958

2,841,095

RAILWAY VEHICLE TRUCK

James C. Travilla, University City, Mo., and Adelbert C. Wintemberg, Drexel Hill, and Robert E. Stein, Boothwyn, Pa., assignors to General Steel Castings Corporation, Granite City, Ill., a corporation of Delaware Application August 30, 1954, Serial No. 453,048

15 Claims. (Cl. 105—188)

The invention relates to railway rolling stock and more particularly to trucks having motors associated with the axles for driving the vehicle.

In a conventional type of three axle or six-wheel motor truck which includes a truck frame and a body-supporting bolster mounted for movement relative to the truck frame, the frame usually includes a pair of longitudinally-spaced transverse transoms between the middle axle and each end axle and the H-shaped bolster includes a cross member between each pair of transoms, each cross member being supported at its ends from the transoms or from the adjacent portions of the sides of the frame. The inner transoms are depressed between their ends and the bolster central member extends longitudinally of the truck over the inner depressed portions of the transoms and is provided with a main load-supporting central bearing. The frame transoms must be spaced far enough from the end axles to accommodate the housings of the motors mounted upon the end axles and extending longitudinally of the truck therefrom and partially supported from the frame transoms. Also in this conventional truck, it is desirable that the bolster cross members and the transoms of the frame be at a level which provides a low center of gravity for the vehicle, but the positioning of each bolster cross members between a pair of transoms requires that the truck wheel base be longer to accommodate these parts than would be necessary were motors not required.

The main object of the invention is to arrange the frame transoms and bolster in a truck of the class described so as to provide a minimum wheel base and a minimum weight truck frame without sacrificing the desirable mounting of the bolster cross members on the truck frame by double swing hangers suspended from the frame to swing transversely of the truck. This object is accomplished by providing a truck frame having a single transom intermediate the central axle and each end axle for supporting the motors instead of having two pairs of transoms, as is customary when double swing hangers are used.

These and other detailed objects as will appear from the description below are attained by the structure illustrated in the accompanying drawings, in which:

Figure 1 is a top view of a six wheel truck embodying one form of the invention.

Figure 2 is in part a side elevation and in part a longitudinal vertical section taken on the line 2—2 of Figure 1.

Figure 3:
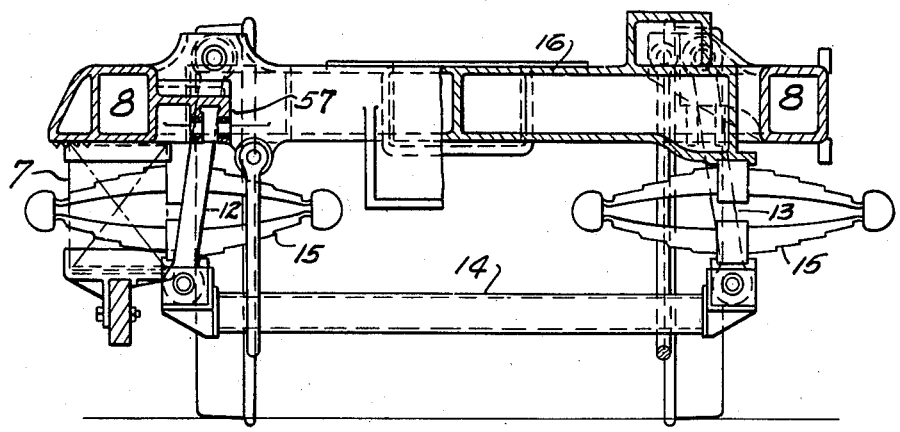
Figure 3 is a vertical transverse section taken approximately on the line 3—3 of Figure 1.

The truck shown in Figures 1–3 comprises wheels 1, axles 2, 3, and 4 mounting journal boxes 5. Drop equalizers 6 extend between each central middle journal box and the end journal boxes and mount equalizer springs 7. The truck frame preferably consists of a one piece casting having side members or wheel pieces 8, transverse end members 9, and transverse transoms 10 positioned between middle axle 3 and each end axle. The frame also includes brackets 11 extending inwardly from each wheel piece 8 and paralleling and associated with, but spaced from, transoms 10. Swing hangers 12 are suspended from the end portions of transoms 10 and hangers 13 are suspended from brackets 11. A spring plank 14, extending transversely of the truck, is supported at its ends from corresponding pairs of hangers 12, 13 and mounts leaf springs 15 which, in turn, support the truck bolster comprising cross members 16 carried on springs 15 and connected by a longitudinal central member 17, having a body-carrying central bearing 18. Chafing plates 19 are provided on the frame and bolster to hold the bolster in longitudinal relation with the truck frame. Associated with each end axle is a driving motor 20 including a housing extending towards the middle of the truck with an end portion or nose 21 spring-supported on an L-shaped bracket 22 depending from the adjacent frame transom 10. The motors on the end axles extend toward the middle of the truck, the wheel and axle assemblies are spaced apart equally, and the center plate is located at the center of the truck over the middle axle. This arrangement provides for symmetrical distribution of the truck weights and the body load longitudinally of the truck.

The spacing of brackets 11 and the end portions of transom 10 lengthwise of the truck from the axles is determined by the clearance between these parts and the wheel treads necessary to accommodate the usual brake rigging (not shown) suspended from brake hanger lugs 23, 24 and brackets 11, and the end portions of the associated transoms 10 are spaced apart a far enough distance to accommodate between them the ends of the bolster cross members.

As most clearly shown in Figure 1, the middle portions of the truck frame transoms are offset longitudinally of the truck at 10a and the middle portions of the bolster cross members are similarly offset at 16a, permitting these parts to be at substantially the same level, as best shown in Figure 2, and at the same time, avoid increasing the truck wheel base as would be necessary if the transoms and bolster cross members were straight throughout their length. Obviously, the use of short brackets 11 extending inwardly from the frame wheel pieces simplifies and lightens the truck structure over the common arrangement of an inner transom extending transversely of the truck, which would have to be depressed beneath the bolster or which would require the bolster to be at an undesirable high level if it were extended upwardly over the transom.

Figure 4:
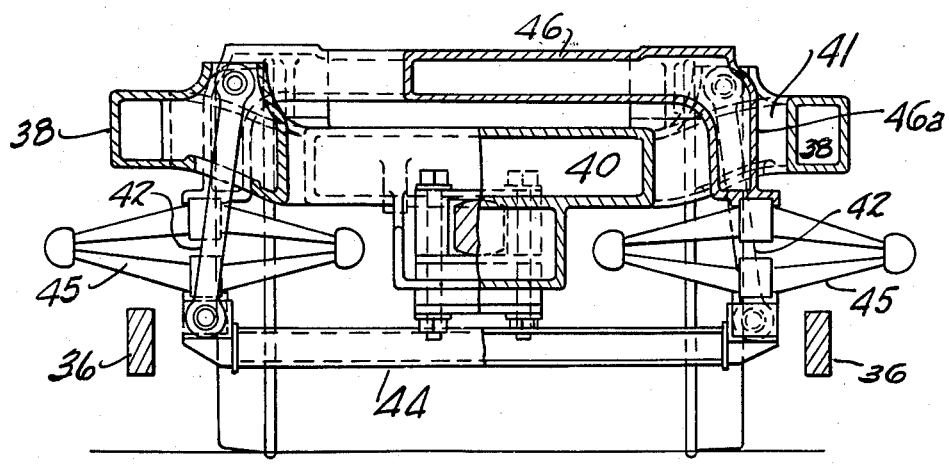
Figure 4 is a vertical transverse section through one half of a truck corresponding generally to the section shown in Figure 3, but illustrating another form of the invention and is taken upon line 4—4 of Figure 5.
Figure 5:
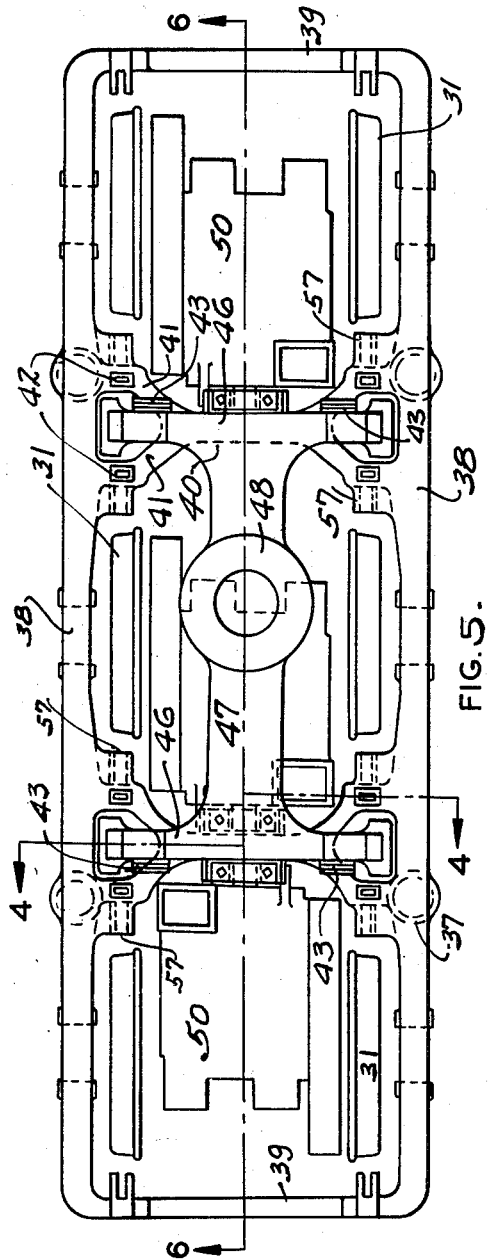
Figure 5 is a top view of the structure shown in Figure 4.
Figure 6:
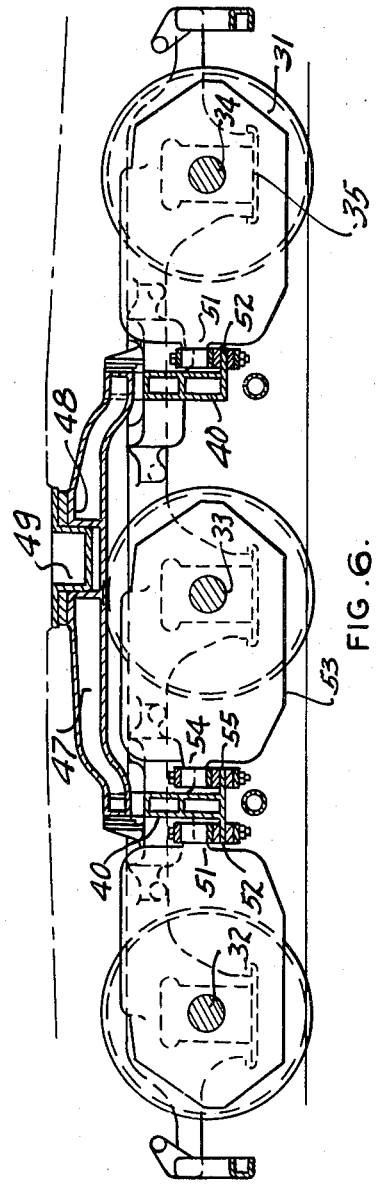
Figure 6 is a vertical section taken on the line 6—6 of Figure 5.

In the structure shown in Figures 4, 5, and 6, the arrangement of wheels 31, axles 32, 33, and 34, journal boxes 35, equalizers 36, and equalizer springs 37 are substantially the same as previously described. The truck frame includes wheel pieces 38, transverse ends 39, and transverse transoms 40 positioned intermediate of the middle axle and the end axle. Each transom 40 is bifurcated near its ends as indicated at 41 and the outer end of each bifurcation merges with the adjacent portions of the frame wheel piece and is apertured and provided with bearings for a swing hanger 42.

A spring plank 44 is supported at its ends from corresponding pairs of swing hangers 42 and mounts leaf springs 45 which in turn support the truck bolster comprising cross members 46 substantially vertically aligned with transoms 40 and overlying the latter between bifurcations 41 at opposite ends of the transoms but terminating in downturned end portions 46a projecting between transom bifurcations 41 and resting upon springs 45. Bolster cross members 46 are connected by a longitudinal central member 47 which includes a central bearing 48 upon which the body central bearing 49 is pivotally supported. Chafing plates 43 are provided on the bolster and the truck frame to hold the bolster in longitudinal relation with the truck frame.

Associated with each end axle is a driving motor 50 including a housing extending towards the middle of the truck with an end portion or nose 51 supported upon a bracket 52 projecting from the adjacent frame transom 40. Associated with the middle axle 33 is a motor 53 including a housing extending towards the left-hand transom 40 and including an end portion or nose 54 supported upon a bracket 55 projecting from the transom.

A brake rigging (not shown) may be supported from brake hanger brackets 57 merging with the frame wheel pieces 38 and transom portions 41.

With this arrangement the transoms and bolster cross members are positioned the same distance from the axles and the truck wheel base is not increased as would be the case if the transoms and bolster cross members were disposed side by side, as in the conventional arrangement. Also the bolster cross members extend over the transoms. The latter are at a lower level than the frame wheel pieces and the end portions of the bolster longitudinal member are at a lower level than the intermediate portion which must be at a high level, compared with the arrangement shown in Figures 1–3, in order to clear the motor 53 on the middle axle.

Other arrangements of the essential parts may be made without departing from the spirit of the invention and the exclusive use of those modifications of the structure shown and coming within the scope of the claims is contemplated.

What is claimed is:

1. In a railway truck, spaced axles and wheels, a truck frame supported therefrom and including wheel pieces connected by transverse transoms positioned between said axles, a bolster supported from said frame with a load-supporting member extending longitudinally of the truck and with cross members at the ends of said longitudinal member, the end portions of each transom being offset lengthwise of the truck away from the middle portion of the transom and towards the adjacent end of the truck, and the end portions of said bolster cross members being alined transversely of the truck, at least in part, with the intermediate portions of said transoms.

2. In a railway truck, spaced axles and wheels, a truck frame supported therefrom and including wheel pieces connected by transverse transoms positioned between said axles, a bolster spring-supported from said frame and including cross members extending generally parallel to and in close relation to said transoms, the ends of said transoms and bolster cross members being offset transversely of their length from their intermediate portions in order to accommodate associated truck structure positioned between the opposite ends of each transom.

3. In a railway truck, three spaced axles with wheels, a truck frame supported therefrom and including wheel pieces connected by transverse transoms and having brake hanger brackets projecting inwardly from the wheel pieces adjacent to the wheels of the end axles, motors on the end axles with housings extending towards the adjacent transoms, the transoms extending inwardly of the truck from said brackets and then being offset longitudinally of the truck away from the end axles to clear the motor housings, and a bolster with a load carrying central portion above the middle axles and with cross members at the ends of said central portion, said cross members being offset transversely of their length to avoid interference with said transoms.

4. In a railway truck, spaced axles and wheels, a truck frame supported therefrom and including wheel pieces connected by transverse transoms, there being brake hanger brackets projecting inwardly from the wheel pieces adjacent to the wheels on the end axles, each transom including a main central portion and end portions offset lengthwise of the truck towards the wheels on the adjacent end axle and merging with said brackets, and a bolster spring-supported from the frame and including spaced cross members and a load-carrying member connecting said cross members between their ends, the end portions of said bolster cross members being offset transversely of their intermediate portions similarly to the corresponding transoms and being positioned in alignment lengthwise of the truck, at least in part, with said brake hanger brackets and being at the sides of the latter more remote from wheels on the nearest end axle.

5. In a railway truck, three axles with wheels, equalizers between and supported on adjacent axles, springs on said equalizers and nearer to the end axles than to the middle axle, a truck frame carried on said springs and including wheel pieces and transverse transoms merging at their ends with the wheel pieces adjacent to said springs and offset intermediate their ends towards each other, a bolster including cross members supported at their ends from the end portions of said frame transoms and offset intermediate their ends towards each other to clear the offset portions of said transoms, the bolster having a load-carrying center member supported from said cross members, there being driving mechanism mounted on the end axles and including parts extending towards the offset portions of said transoms.

6. In a railway truck, spaced wheel and axle assemblies, a truck frame supported therefrom and including wheel pieces and transverse members extending between said wheel pieces, a bracket extending inwardly from each wheel piece adjacent to but spaced from each end portion of each transom, swing hangers suspended from each bracket and from the adjacent transom end portion, and a bolster having cross members at substantially the same level as said brackets and transoms and being supported on said hangers.

7. In a railway truck, three axles with wheels, equalizers between and supported on adjacent axles, springs on said equalizers and nearer to the end axles than to the middle axle, a truck frame carried on said springs and including wheel pieces and transverse transoms having bifurcated ends merging with the side members between the middle axle and the end axles, a bolster with a central load-carrying member extending lengthwise of the truck over the middle axle and with cross members at the ends of the central member and overlying the central portions of the transoms, the ends of the bolster cross members projecting downwardly between the corresponding bifurcations of the transoms and supported from the truck frame adjacent to said equalizer springs.

8. In a railway truck, spaced axles with wheels, a truck frame supported therefrom, and including transverse transoms, hangers pivotally suspended from said frame to swing transversely of the truck, springs supported from said hangers, a bolster having cross arms extending over substantial portions of said transoms and terminating in down-turned parts extending through apertures in said transoms and supported on said springs.

9. A railway truck frame comprising side members having dependent pedestals near their ends for receiving journal boxes, transverse transoms connecting said side members, brake hanger brackets at the intersections of said side members and transoms adjacent to said pedestals, the intermediate portions of said transoms being offset away from said brake hangers lengthwise of the frame and towards the middle of the frame.

10. A railway truck frame comprising side members and transverse transoms connecting said side members and spaced apart longitudinally of the frame, said transoms being offset toward each other intermediate their respective ends.

11. A railway truck bolster comprising spaced cross members provided with support-engaging terminals, said members being offset from their terminals toward each other intermediate their ends, and a central load-mounting longitudinal member extending between the offset portions of said members.

12. In a railway truck, three axles with wheels, a truck frame supported therefrom and including wheel pieces and transverse transoms having bifurcated ends merging with the side members between the middle axle and the end axles, a bolster with a central load-carrying member extending lengthwise of the truck over the middle axle and with cross members at the ends of the central member and overlying the central portions of the transoms, the ends of the bolster cross members projecting downwardly between the corresponding bifurcations of the transoms and supported from the truck frame.

13. In a railway truck, spaced axles with wheels, a truck frame supported therefrom, and including transverse transoms, a bolster having cross arms extending over substantial portions of said transoms and terminating in downturned parts extending through apertures in said transoms and supported on said frame.

14. In a railway truck, a wheel and axle assembly near each end of the truck, a truck frame mounted on said assemblies and including side members and a transverse transom extending between said side members between each of said assemblies and the middle of the truck, a motor mounted on the axle of each of said assemblies, and provided with a housing extending from its mounting axle toward the adjacent transom and supported on the latter, each of said transoms being offset between its ends longitudinally of the truck away from the corresponding adjacent axle and toward the middle of the truck to clear the projecting end of the motor housing mounted on the adjacent axle, a bolster including cross members supported from said frame transoms, said members being at substantially the same level as said transoms and spaced apart lengthwise of the truck and having end portions offset similarly to said transoms to accommodate the offsets in said transoms, the bolster including a central load-supporting member extending between and carried by said transverse portions.

15. In a railway truck, spaced axles and wheels, a truck frame supported therefrom and including wheel pieces connected by a transverse transom positioned between said axles, a bolster supported from said frame and having a cross member adjacent said transom, the end portions of said transom being offset from the intermediate portion of said transom longitudinally of the truck toward the end of the truck, and the end portions of said bolster cross member being offset from the intermediate portion of said cross member similarly to said transom and being substantially at the level of said intermediate portion of said transom and in substantial alignment therewith transversely of the truck.

References Cited in the file of this patent
UNITED STATES PATENTS

| | | |
|---|---|---|
| 997,395 | Knight | July 11, 1911 |
| 1,102,620 | Westlake | July 7, 1914 |
| 1,178,098 | Pilcher | Apr. 4, 1916 |
| 1,902,974 | Sheehan et al. | Mar. 28, 1933 |
| 2,173,725 | Pflager | Sept. 19, 1939 |
| 2,258,656 | McCormick | Oct. 14, 1941 |
| 2,267,814 | Burdick | Dec. 30, 1941 |
| 2,705,924 | Travilla et al. | Apr. 12, 1955 |